United States Patent
DaCosta et al.

(10) Patent No.: US 7,293,115 B2
(45) Date of Patent: Nov. 6, 2007

(54) INTERNET-AWARE AGENT FOR AUTOMATICALLY UPDATING APPLICATIONS WITHOUT EXECUTING THE APPLICATION

(75) Inventors: Behram Mario DaCosta, San Jose, CA (US); Hans Masli, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 723 days.

(21) Appl. No.: 09/796,869

(22) Filed: Feb. 28, 2001

(65) Prior Publication Data

US 2002/0120725 A1    Aug. 29, 2002

(51) Int. Cl.
G06F 9/445    (2006.01)
G06F 15/177    (2006.01)

(52) U.S. Cl. .................. 710/8; 713/1; 710/10; 709/203; 709/219; 717/173

(58) Field of Classification Search .................. 717/11; 709/200, 221, 220; 710/8, 15, 19
See application file for complete search history.

(56) References Cited

U.S. PATENT DOCUMENTS

| | | | | |
|---|---|---|---|---|
| 5,752,042 A | * | 5/1998 | Cole et al. | 717/173 |
| 5,960,204 A | * | 9/1999 | Yinger et al. | 717/176 |
| 6,006,034 A | * | 12/1999 | Heath et al. | 717/170 |
| 6,167,567 A | * | 12/2000 | Chiles et al. | 717/173 |
| 6,199,204 B1 | * | 3/2001 | Donohue | 717/178 |
| 6,282,647 B1 | * | 8/2001 | Leung et al. | 713/100 |
| 6,308,204 B1 | * | 10/2001 | Nathan et al. | 709/221 |
| 6,330,715 B1 | * | 12/2001 | Razzaghe-Ashrafi | 717/171 |
| 6,334,101 B1 | * | 12/2001 | Hetherington et al. | 704/8 |
| 6,381,741 B1 | * | 4/2002 | Shaw | 717/168 |
| 6,457,076 B1 | * | 9/2002 | Cheng et al. | 710/36 |
| 6,604,238 B1 | * | 8/2003 | Lim et al. | 717/177 |
| 7,016,944 B1 | * | 3/2006 | Meyer et al. | 709/218 |
| 2002/0073057 A1 | * | 6/2002 | Benoit et al. | 707/1 |

FOREIGN PATENT DOCUMENTS

WO    WO 0237203 A2 * 5/2002

* cited by examiner

*Primary Examiner*—Ilwoo Park

(57) ABSTRACT

A method and system thereof for updating applications installed on a computer system. Each application supplies the name of a source (e.g., a Web site address) from which updates can be obtained. Upon boot up, the boot loader reads the addresses, locates the interface for connecting with the Internet, and connects with each of the Web sites. Updated application information is identified and can be downloaded from the Web sites to the computer system. Also, information can be downloaded to change the graphical user interface for the application. Furthermore, the Web site can determine whether the application is authorized for use on the computer system. Alternatively, a single Web site can be used for multiple applications. In addition, this process can instead be implemented as a background function after boot up. In each implementation, applications are conveniently and reliably updated without having to execute the applications.

16 Claims, 4 Drawing Sheets

300

310
IDENTIFY FROM AN APPLICATION A SOURCE OF UPDATE INFORMATION FOR THE APPLICATION

↓

320
IDENTIFY A COMMUNICATION INTERFACE

↓

330
ESTABLISH A COMMUNICATION LINK WITH THE UPDATE SOURCE

↓

340
IDENTIFY AN UPDATE AVAILABLE FOR THE APPLICATION

↓

350
DOWNLOAD THE UPDATE

Figure 3

INTERNET-AWARE AGENT FOR AUTOMATICALLY UPDATING APPLICATIONS WITHOUT EXECUTING THE APPLICATION

BACKGROUND OF THE INVENTION

1. Field of the Invention

The present invention relates to software applications used by computer systems. More specifically, the present invention pertains to a method and system for automatically managing and updating software applications installed on computer systems.

2. Related Art

Users typically install software applications on their computer systems from floppy disks (magnetic storage), compact disks (optical storage), or some other type of computer-readable media. After the application has been purchased and installed by the user, software vendors often find it desirable to provide updates to their customers. The updates often provide enhancements and new features that improve the software application, providing a more satisfactory user experience and thereby increasing the likelihood of future use and sales.

The number of different software applications available for use on computer systems is substantial. Each application can also have multiple versions, further increasing the number of applications in use. Among computer systems used in homes, there is little or no uniformity with regard to the applications installed from one home to the next. In a business environment, there is some degree of uniformity among the applications installed on the computers used within a particular business, but there is still a lack of uniformity between businesses.

As a result of the number and variety of applications in use, it is difficult to provide updates to users. The difficulty lies not only in identifying who is using the application, but what version of the application they are using.

The widespread availability of the Internet offers one solution for providing software updates to users. Updates can be posted on and downloaded from Web sites accessible by users via the Internet. However, this type of solution requires deliberate actions on the part of the user to track down and download updates. Users must also be able to identify which version of the software they are using, or which updates they have already implemented. In many cases, users do not want to be inconvenienced with the effort needed to locate, identify, and implement updates. Also, users often will not know when new updates become available. Rather than search for updates on a frequent basis only to find, for example, that no updates are available, the typical user will most likely not search at all.

Some applications, particularly those that are updated on a regular basis such as anti-virus programs, are configured to remind the user to download an update on a periodic basis. However, a problem with these applications, and others like them, is that deliberate actions are still needed from the user in order to receive an update. In addition, it is often necessary to guess how frequently a search for updates should be made; a shorter interval may unduly inconvenience the user, while a longer interval may delay receiving a desirable update. Furthermore, in many cases, the user must first execute the application in order to be made aware of the need to check for an update. Oftentimes, instead of retrieving the update, the user would rather let the application continue executing so that the task at hand can be completed without interruption. Consequently, the update may be overlooked and left unperformed.

SUMMARY OF THE INVENTION

Thus, a need exists for a system and/or method that can be used to update software applications installed on computer systems, particularly applications that receive widespread use. A need also exists for a system and/or method that can satisfy the above need reliably and conveniently, without interrupting the user.

The present invention pertains to a method and system thereof for managing and updating applications installed on a computer system. In the present embodiment, each application installed on the computer system supplies the name of a source (e.g., a Web site address) from which updates can be obtained. In one embodiment, the address information is stored in a registry when each application is installed on the computer system. In another embodiment, the address information is provided each time the application is booted up or updated.

In one embodiment, upon boot up of the computer system, the boot loader reads the addresses for each application to be updated, locates the interface for connecting with the Internet, and connects with each of the Web sites. In accordance with the present invention, either the boot loader or agents residing at the Web sites identify the version of the application to be updated, whether application information is available to update the application, and whether sufficient memory and/or storage exists to download the update information. Optionally, the user can be prompted to select whether or not update information should be downloaded. The update information can then be downloaded from the Web site(s) to the computer system, either in encrypted or unencrypted form.

To increase the speed of the boot up process, a single information source can be established for multiple applications (e.g., a single Web site can serve as a clearinghouse for multiple Web sites). Another way to speed up the boot up process is to only check for updates for those applications being booted up (instead of checking for updates to all applications installed on the computer system).

In one embodiment, information can be downloaded to change the graphical user interface for the application. As a result, the "look and feel" of the user interface can be dynamically changed.

In another embodiment, the information source (e.g., the Web site) can determine whether an application is authorized for use on the computer system. That is, an application can be uniquely identified and associated with a particular computer system, and this information can be used to authenticate proper use of the application when the connection is made by the computer system to the Web site.

In yet another embodiment, aspects of the present invention can instead be implemented as a background function after boot up, using an agent residing on the computer system other than the boot loader.

Thus, in accordance with the present invention, applications are conveniently and reliably updated either during boot up or in the background when computer system resources are available. Consequently, software updates can be more readily distributed; however, the initiative for locating and implementing the updates is shifted to the computer system, so it is not necessary for the vendor to identify who is using what version of an application. Moreover, because the updates can be automatically retrieved each time the computer system is booted up or used, the updates can be distributed in a timely manner without inconveniencing the user. Significantly, applications can be automatically updated without having to execute the applications and transparent to the user, so that the user is not diverted from completing the task at hand. These and other advantages of the present invention not specifically mentioned above will become clear within discussions of the present invention presented herein.

BRIEF DESCRIPTION OF THE DRAWINGS

FIG. 3 is a flowchart of the steps in a process implemented on a user's computer system to update application information in accordance with one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated.

Unless specifically stated otherwise as apparent from the following discussions, it is appreciated that throughout the present invention, discussions utilizing terms such as "identifying," "establishing," "downloading," "reading," "providing," "receiving," "determining," "sending," "accessing" or the like, refer to actions and processes (e.g., processes 300 and 400 of FIGS. 3 and 4, respectively) of an electronic device, such as a computer system or similar electronic computing device that manipulates and transforms data represented as physical (electronic) quantities within the computer system's registers and memories into other data similarly represented as physical quantities within the computer system memories or registers or other such information storage, transmission or display devices.

Figure 1:
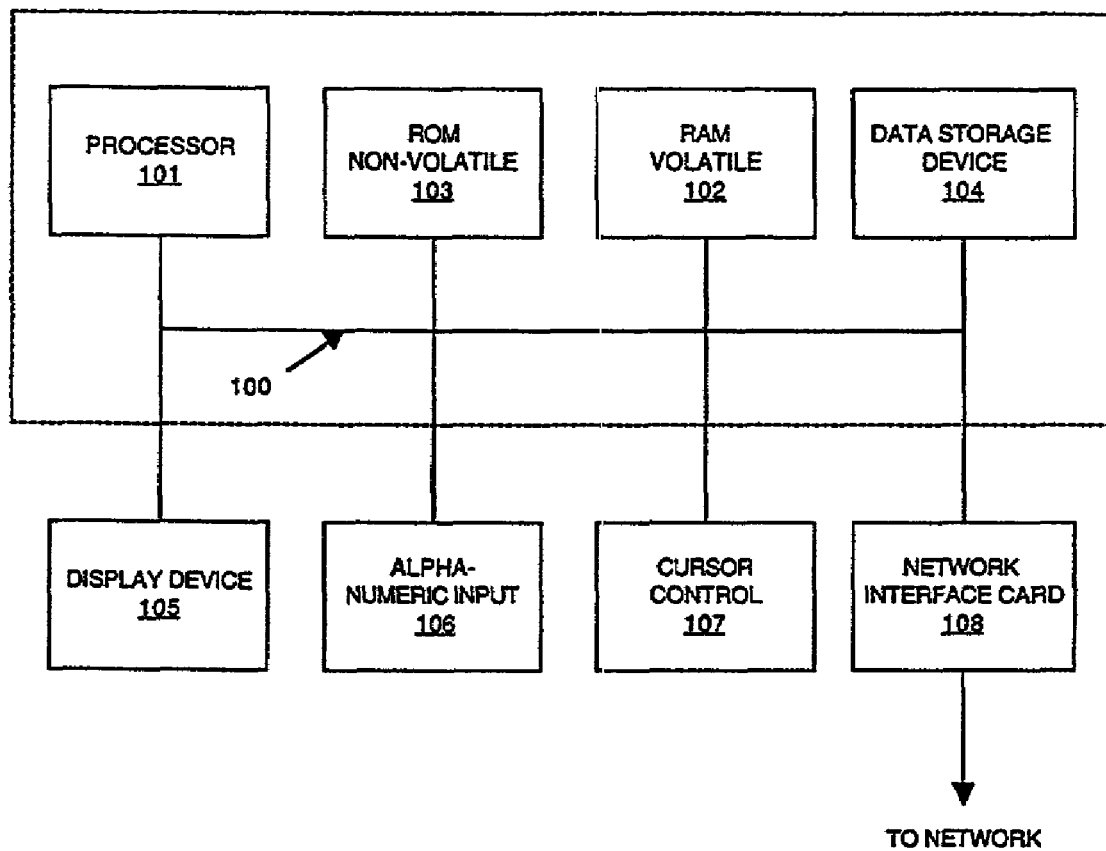
FIG. 1 is a block diagram of an exemplary general purpose computer system upon which embodiments of the present invention can be implemented.

Refer now to FIG. 1, which illustrates an exemplary computer system 190 upon which embodiments of the present invention may be practiced. Computer system 190 is described as a desktop, laptop or notebook computer system; however, it is contemplated that aspects of the present invention can be implemented on other types of computer systems such as portable computer systems (e.g., palmtops, hand-helds, and the like). Furthermore, aspects of the present invention can be implemented on so-called Internet appliances; that is, those devices that connect with remote sites and execute software stored at the remote site.

In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information. to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card 108 (or another type of communication interface) is used to couple computer system 190 onto the Internet, an Intranet, a local area network, or the like, via either a wired or wireless connection.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Aspects of the present invention can also be implemented on so-called "embedded devices" that may not include one or more of the elements of computer system 190. For example, the present invention may be implemented on an embedded device that does not include a display device 105, or it may be implemented on a device that does not include an alphanumeric input device 106.

Figure 2:
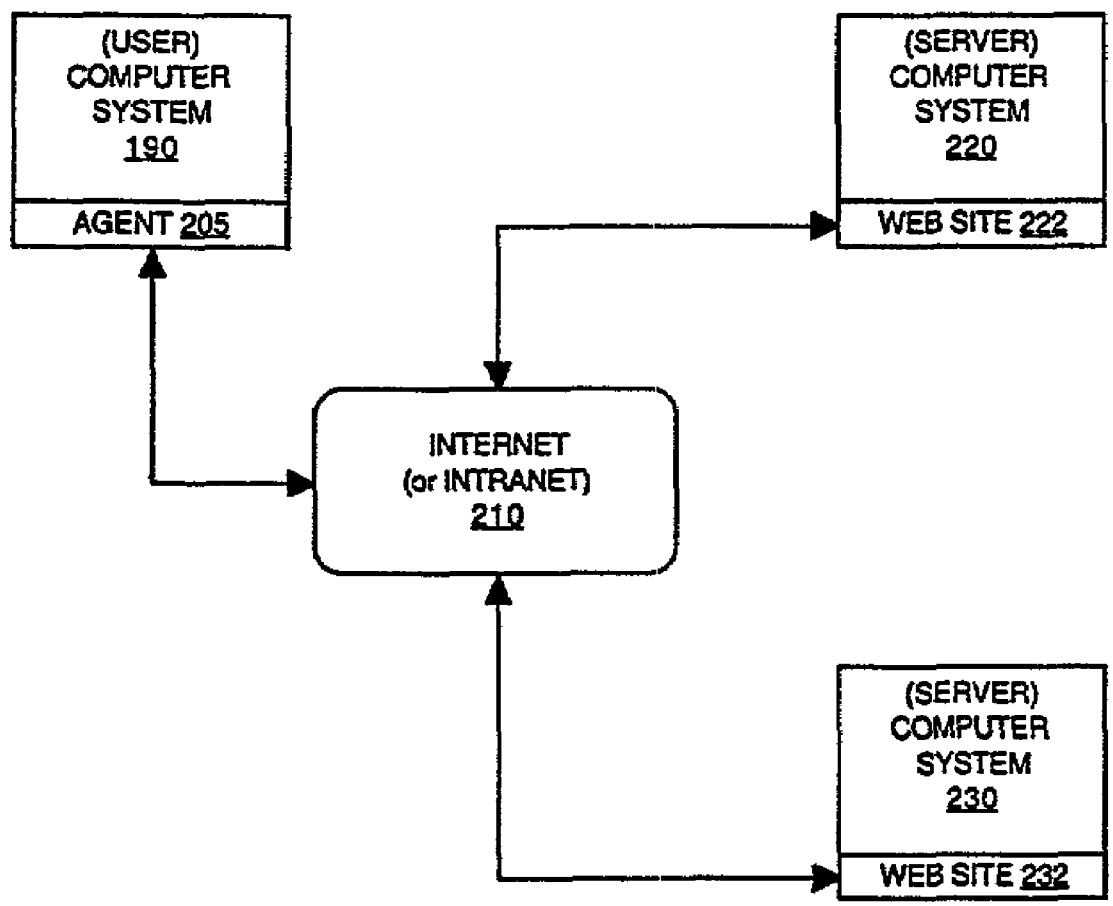
FIG. 2 is a block diagram of an exemplary network of computer systems upon which embodiments of the present invention can be implemented.

FIG. 2 is a block diagram of an exemplary network 200 of computer systems 190, 220 and 230 upon which embodiments of the present invention can be implemented. Network 200 may be a communication network located within a firewall of an organization or corporation (an "Intranet"), or network 200 may represent a portion of the World Wide Web or Internet.

The mechanisms for coupling computer systems 190, 220 and 230 over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, computer systems 190, 220 and 230 can be coupled via their respective input/output ports (e.g., serial ports) or via wireless connections (e.g., according to IEEE 802.11b).

With reference still to FIG. 2, in the present embodiment, residing on the user's computer system 190 is an agent 205. Agent 205 is a software program or set of computer-readable program instructions that implements the present invention method for updating applications (see FIG. 3, below). In one embodiment, agent 205 is the boot loader that executes during boot up of computer system 190 (the boot loader runs at startup to initialize and configure system hardware). In another embodiment, agent 205 executes in the background after boot up of computer system 190, for example, during periods of time when computer system resources are not being fully utilized and are therefore available to update applications without interfering with other ongoing tasks and functions.

Continuing with reference to FIG. 2, in the present embodiment, Web site 222 and Web site 232 reside on computer systems 220 and 230, respectively. Web site 222 comprises information (e.g., files or links to files) that can be used to update a first application residing on computer system 190. Similarly, Web site 232 comprises information (e.g., files or links to files) that can be used to update a second application residing on computer system 190. It is appreciated that there can be more than one Web site residing on each of computer systems 220 and 230, or that network 200 can include computer systems in addition to computer systems 190, 220 and 230.

In general, in one embodiment, there is a Web site associated with each application that may be installed on computer system 190. In another embodiment, a single Web site may serve as a single point-of-contact (e.g., a clearinghouse) for multiple applications. In this latter embodiment, information for updating each of the multiple applications may reside on the single Web site. For example, software vendors may subscribe to the single Web site and provide updates to that site as they become available. Alternatively, the single Web site may provide a catalog of available updates with links to other Web sites from which the updates can be obtained.

Thus, in accordance with the present embodiment of the present invention, in order to identify and receive updates for applications installed on computer system 190, agent 205 can orchestrate a connection over Internet (or Intranet) 210 to individual Web sites 222 and 232 that are each associated with a respective application, or to a single Web site (e.g., Web site 222) that may be linked to other Web sites.

FIG. 3 is a flowchart of the steps in a process 300 implemented on a user's computer system 190 (FIGS. 1 and 2) to identify and receive updates in accordance with one embodiment of the present invention. In this embodiment, process 300 is implemented by computer system 190 as computer-readable program instructions (e.g., boot up loader or agent 205 of FIG. 2) stored in a memory unit (e.g., ROM 103 of FIG. 1) and executed by a processor (e.g., processor 101 of FIG. 1). Process 300 can be implemented either during boot up of computer system 190, or as a background function sometime after boot up. Also, process 300 can be implemented according to a defined schedule or at a specified frequency. In the case of portable devices (e.g., palmtop computer systems and the like), process 300 can be implemented when the portable device is synchronized with computer system 190, when the portable device is recharged with power, or in response to some other type of triggering event.

In step 310 of FIG. 3, when an application is installed on computer system 190, a set of information about the application is registered in a registry. In one embodiment of the present invention, the application includes a registry key that identifies a source of information from which update information can be obtained. For example, the registry key could specify a Uniform Resource Locator (URL) for a Web site (e.g., Web site 222 of FIG. 2) comprising update information for the application. In another embodiment, associated with each application is a set of information that is read during boot up of computer system 190. In this embodiment, the boot up information for the application includes information identifying the source of update information (e.g., a URL as described above).

Thus, in the present embodiment, agent 205 (FIG. 2) identifies a source for updates using either the registry information or the boot up information. In one embodiment, agent 205 identifies a source for each application installed on computer system 190. In another embodiment, agent 205 identifies a source only for those applications that are running (that is, those applications that have been booted up; here, "running" does not necessarily imply "executing," and instead refers to an application that is ready for execution in response to a user input).

In step 320 of FIG. 3, in the present embodiment, agent 205 seeks out and identifies a communication interface (e.g., NIC 108 of FIG. 1) that can be used to communicatively link computer system 190 to the update source(s) (e.g., Web sites 222 and 232 of FIG. 2). For example, agent 205 can determine whether an Internet connection can be made.

In step 330 of FIG. 3, in the present embodiment, agent 205 automatically establishes, in turn, a communication link (e.g., an Internet or Intranet connection) with each of the Web sites 222 and 232. Alternatively, agent 205 can establish a communication link with a single Web site as described above.

In step 340, in one embodiment, agent 205 searches each Web site 222 and 232 for updates that are available for downloading to computer system 190. In another embodiment, an agent residing at each Web site 222 and 232 performs the search on behalf of agent 205. In order to identify whether an update is available, agent 205 (or Web sites 222 and 232) identify the version of the application installed on computer system 190 and whether other updates have been previously installed. In one embodiment, after an update is identified, either agent 205 or the agent residing on the Web site determines whether computer system 190 has sufficient memory and/or storage to download and implement the update.

In one embodiment, at some point prior to downloading an update, agent 205 and Web sites 222 and 232 execute a "hand-shake" protocol. That is, each Web site 222 and 232 authenticates that their associated applications are properly authorized for use on computer system 190. For example, Web site 222 can read license information, a serial number, password, user name (user ID) or the like to determine that the application associated with Web site 222 is properly authorized for use on computer system 190. Similarly, computer system 190 can provide a user ID, password or the like as a security measure before downloading an update.

In step 350, available updates are downloaded to computer system 190 from each Web site 222 and 232, either in encrypted or unencrypted form. In one embodiment, before the updates are downloaded, the user is prompted to make a decision whether or not to download an update. For example, a pop-up menu can be optionally displayed to the user.

It is appreciated that the update information includes modifications to the information used by the application. As used herein, information used by the application includes but is not limited to the program instructions embodied by the application as well as information (e.g., files, dynamic link libraries, and the like) called by the application. Accordingly, the update can include new files called by the application, changes to files called by the application, patches incorporated into the application, and the like.

In one embodiment, the updates include changes to the libraries (e.g., dynamic link libraries) and files used by the application to generate a graphical user interface. Thus, in accordance with the present invention, the user interface for an application can be dynamically changed to provide a new "look and feel" to the user.

In one embodiment, the information provided by an update includes the identity of the information source (e.g., Web site) from which the next (future) update can be obtained.

Figure 4:
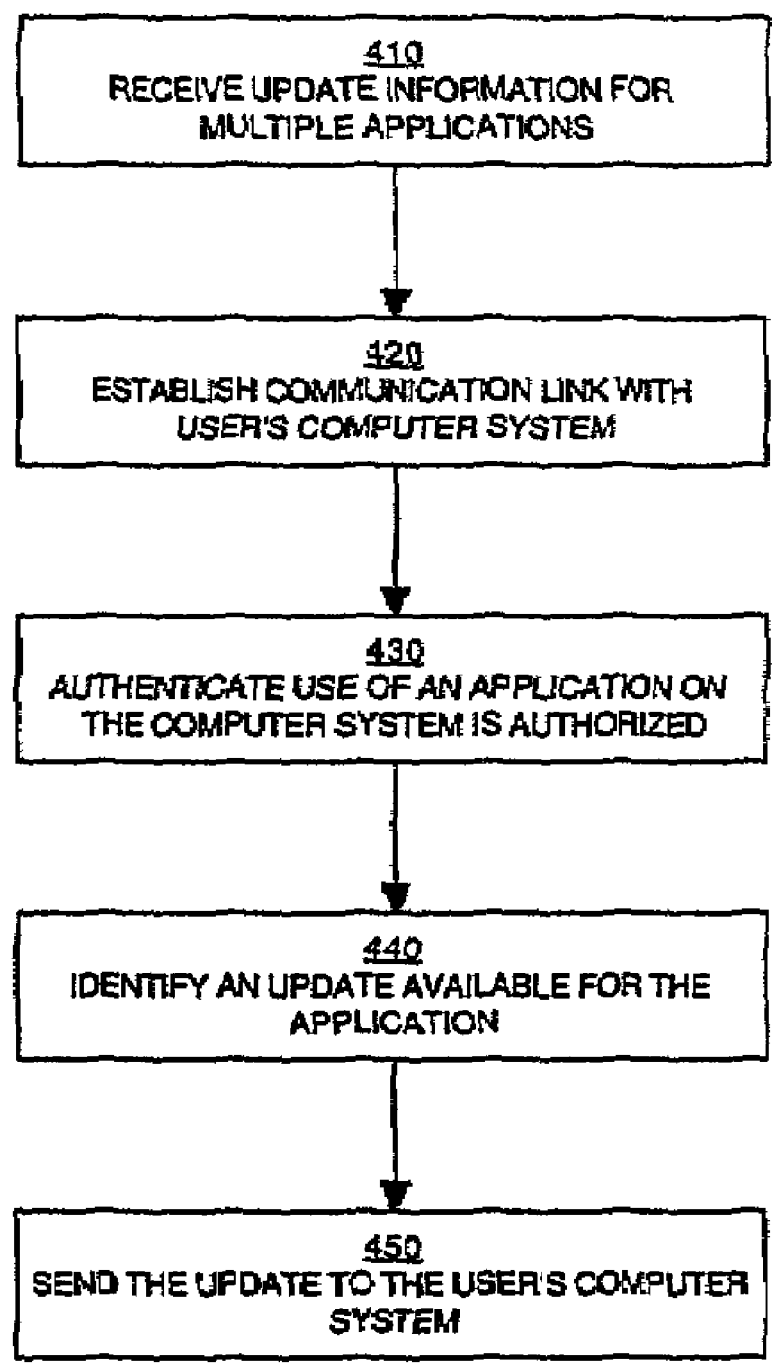
FIG. 4 is a flowchart of the steps in a process implemented on a server computer system to manage and update software applications in accordance with one embodiment of the present invention.

FIG. 4 is a flowchart of the steps in a process 400 implemented on a server computer system (e.g., computer system 220 of FIG. 2) to manage and update software applications in accordance with one embodiment of the present invention. Specifically, process 400 is implemented by an agent residing on a Web site such as Web site 222 of FIG. 2. An exemplary embodiment of computer system 220 is represented by the description of computer system 190 of FIG. 1.

In step 410 of FIG. 4, in the present embodiment, Web site 222 serves as a single point-of-contact (e.g., a clearinghouse) for multiple applications. In one embodiment, information for updating each of the multiple applications may reside on Web site 222. For example, software vendors may subscribe to Web site 222 and provide updates to Web site 222 as the updates become available. In another embodiment, Web site 222 provides a catalog of available updates with links to other Web sites (e.g., Web site 232 of FIG. 2) from which updates can be obtained.

In step 420 of FIG. 4, in the present embodiment, Web site 222 establishes a communication link with computer system 190 via the Internet (or Intranet) 210 of FIG. 2. Web site 222 is located by computer system 190 via a URL as described above in conjunction with FIG. 3. As a result of the communication link, Web site 222 receives an inquiry from computer system 190 regarding one or more applications installed on computer system 190. Specifically, the inquiry pertains to whether there are updates for certain applications installed on computer system 190 (that is, for the application(s) associated with Web site 222).

In step 430 of FIG. 4, Web site 222 and computer system 190 execute a hand-shake protocol as described by step 340 of FIG. 3. Consequently, Web site 222 can authenticate that the applications identified by computer system 190 in step 420 are authorized for use on computer system 190.

In step 440 of FIG. 4, Web site 222 identifies whether updates are available for the application(s) in question. In the present embodiment, a search of the updates that reside at Web site 222 is performed. In another embodiment, computer system 190 provides to Web site 222 the URL for another Web site (e.g., Web site 232 of FIG. 2). In this embodiment, Web site 222 links with Web site 232 and retrieves updates available for the application(s) in question.

In step 450 of FIG. 4, updates identified in step 440 are communicated to computer system 190 via the communication link established in step 420.

In summary, the present invention provides a method and system that can be used to reliably and conveniently update software applications installed on computer systems, without interrupting the user. The method and system of the present invention can be implemented automatically or, optionally, with user intervention. The method and system of the present invention can be implemented when the computer system is booting up, or at a later time as a background function. In either case, applications are updated without having to execute the application, so that users are not interrupted while they are in the process of completing a task. Accordingly, users will have updated versions of applications they have installed on their computer systems. The updates are in essence made invisibly to the user; the user boots up the computer system and executes an application in a normal fashion, and is automatically provided with the most up-to-date version of an application.

The preferred embodiment of the present invention, Internet-aware agent for updating applications, is thus described. While the present invention has been described in particular embodiments, it should be appreciated that the present invention should not be construed as limited by such embodiments, but rather construed according to the below claims.

What is claimed is:

1. A method for updating application information used by an application installed on a computer system, said method comprising:
   a) identifying from said application a first information source external to said computer system, said information source comprising information for modifying said application information;
   b) identifying a communication interface for communicatively coupling said computer system and said information source;
   c) establishing a communication link to said information source via said communication interface;
   d) downloading said information for modifying said application information from said information source; and
   e) providing authorization information for said application, said authorization information for indicating use of said application is authorized on said computer system;
   wherein said steps a)-e) are performed without executing said application and wherein said steps a)-e) are performed by a boot loader during boot up of said computer system, said boot loader running during computer system startup to initialize and configure computer system hardware, and wherein said steps a)-e) are performed only if said application is itself being booted up during said boot up.

2. The method as recited in claim 1 wherein said step a) comprises reading registry information pertaining to said application, wherein said registry information identifies said information source.

3. The method as recited in claim 1 wherein said information source is a Web site.

4. The method as recited in claim 3 wherein said Web site comprises information relevant to a plurality of different applications.

5. The method as recited in claim 1 wherein said step c) further comprises identifying whether information for modifying said application information is available.

6. The method as recited in claim 1 wherein said step d) further comprises providing a prompt indicating information for modifying said application information is available.

7. The method as recited in claim 1 wherein said application information is for generating a user interface for said application, wherein said information for modifying said application information is for changing an aspect of said user interface.

8. The method as recited in claim 1 further comprising receiving information from said first information source that identifies a second external information source other than said first information source from which said computer system can obtain the next update of said application.

9. A computer system comprising:
   a bus;
   a communication interface coupled to said bus, said communication interface for communicatively coupling said computer system and an external information source;
   a processor coupled to said bus; and
   a computer-readable memory unit coupled to said bus, said memory unit containing instructions that when executed implement a computer-implemented method for updating application information used by an application installed on said computer system, said method comprising:
   a) identifying from said application a first external information source comprising information for modifying said application information;
   b) establishing a communication link to said information source via said communication interface;
   c) downloading said information for modifying said application information from said information source; and
   d) providing authorization information for said application, said authorization information for indicating use of said application is authorized on said computer system;
   wherein said steps a)-d) are performed without executing said application and wherein said steps a)-e) are performed by a boot loader during boot up of said computer system, said boot loader running during computer system startup to initialize and configure computer system hardware, and wherein said steps a)-d) are performed only if said application is itself being booted up during said boot up.

10. The computer system of claim 9 wherein said step a) of said method comprises reading registry information pertaining to said application, wherein said registry information identifies said information source.

11. The computer system of claim 9 wherein said information source is a Web site.

12. The computer system of claim 11 wherein said Web site comprises information relevant to a plurality of different applications.

13. The computer system of claim 9 wherein said step b) of said method further comprises identifying whether information for modifying said application information is available.

14. The computer system of claim 9 wherein said step c) of said method further comprises providing a prompt indicating information for modifying said application information is available.

15. The computer system of claim 9 wherein said application information is for generating a user interface for said application, wherein said information for modifying said application information is for changing an aspect of said user interface.

16. The computer system of claim 9 wherein said method further comprises receiving information from said first information source that identifies a second external information source other than said first information source from which said computer system can obtain the next update of said application.

* * * * *